(12) United States Patent
Lee et al.

(10) Patent No.: US 7,549,214 B2
(45) Date of Patent: Jun. 23, 2009

(54) METHOD FOR BONDING SLIDER ROW BARS FOR PHOTOLITHOGRAPHY PROCESS

(75) Inventors: TaiBoon Lee, HongKong (CN); ZiAn Wang, DongGuan (CN); YongPing Gao, DongGuan (CN); ZhenHua Liu, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 235 days.

(21) Appl. No.: 11/514,250

(22) Filed: Sep. 1, 2006

(65) Prior Publication Data
US 2008/0052897 A1 Mar. 6, 2008

(51) Int. Cl.
*G11B 5/127* (2006.01)
*H04R 31/00* (2006.01)

(52) U.S. Cl. ............... 29/603.12; 29/417; 29/603.03; 29/603.04; 29/603.06; 29/743; 216/22; 216/41; 360/234.3; 360/234.7; 451/5; 451/41

(58) Field of Classification Search ............ 29/417, 29/603.04, 603.06, 603.12, 743; 216/22, 216/41; 360/234.3, 234.7; 430/320; 451/5, 451/41
See application file for complete search history.

(56) References Cited

U.S. PATENT DOCUMENTS

| 6,081,991 A | * | 7/2000 | Tsunoda et al. | ......... 29/603.08 |
| 6,129,855 A | * | 10/2000 | Sawada et al. | ................ 216/22 |

* cited by examiner

*Primary Examiner*—Paul D Kim
(74) *Attorney, Agent, or Firm*—Nixon & Vanderhye P.C.

(57) ABSTRACT

Certain example embodiments relate to a method for bonding slider row bars for a photolithography process. A holding device having a sticky surface is formed. A plurality of slider row bars is provided, with each having a first surface for forming an air bearing surface and a second surface opposite the first surface. The slider row bars are secured to the holding device with their first surfaces facing the sticky surface so that the first surfaces of the slider row bars are aligned each other. The slider row bars are bonded together by an encapsulating glue. A carrier is provided, and the carrier is bonded to the second surfaces of the slider row bars. The holding device is removed. The example embodiments also can be used to manufacture sliders.

9 Claims, 21 Drawing Sheets

METHOD FOR BONDING SLIDER ROW BARS FOR PHOTOLITHOGRAPHY PROCESS

FIELD OF THE INVENTION

The present invention relates to a method of manufacturing sliders used in information recording disk drive units, and more particularly to a method of bonding slider row bars for photolithography process.

BACKGROUND OF THE INVENTION

One known type of information storage device is a disk drive device that uses magnetic media to store data and a movable read/write head that is positioned over the magnetic media to selectively read from or write to the rotating magnetic media, such as a magnetic disk.

FIG. 1a illustrates a conventional disk drive device 200 and shows a magnetic disk 101 mounted on a spindle motor 102 for spinning the disk 101. A voice coil motor arm 104 carries a head gimbal assembly (HGA) 100 that includes a micro-actuator 105 and a slider 103 incorporating a read/write head. A voice-coil motor (VCM) is provided for controlling the motion of the motor arm 104 and, in turn, controlling the slider 103 to move from track to track across the surface of the disk 101, thereby enabling the read/write head to read data from or write data to the disk 101. In operation, a lift force is generated by the aerodynamic interaction between the slider 103 and the spinning magnetic disk 101. The lift force is opposed by equal and opposite spring forces applied by a suspension of the HGA 100 such that a predetermined flying height above the surface of the spinning disk 101 is maintained over a full radial stroke of the motor arm 104.

FIG. 1b illustrates a perspective view of the slider shown in FIG. 1a in a bottom view. As illustrated, a magnetic reading/writing head 116, which is used for realizing data reading/writing operation of the slider relative to the disk 101, is formed on one side surface of the slider 103. The slider 103 has an air bearing surface (ABS) 117 facing to the disk 101. When the disk drive device is in operation, an aerodynamic interaction is generated between the ABS 117 of the slider 103 and the rotary disk 101 in a high speed, thus making the slider 103 floating over the disk 101 dynamically to perform data reading/writing operation.

To make the slider read data from or write data to the disk successfully, the slider is required to have a good flying stability, i.e. the flying height of slider is kept at an invariable value when the slider is flying over the disk. If the slider has a bad flying stability, the flying height is variable i.e. sometimes the flying height becomes higher and sometimes the flying height becomes lower. If the flying height is too high, the slider may not successfully realizing a read/write operation; if the flying height is too low, the slider may scratch the disk to cause a damage of the disk and/or the slider.

Understandably, manufacturing accuracy of the ABS of the slider is a key factor to influence the flying stability of the slider. Here, a process of forming the ABS of the slider is described briefly as follows. Generally, the ABS of the slider is formed by photolithography process and vacuum etching process in sequence. At first, a photo-resist coating is covered on an ABS-forming surface of the slider; then, an air bearing surface pattern (ABS pattern) are transferred to the photo-resist coating by exposure; next, the photo-resist coating is developed to get rid of unexposed portions of the photo-resist coating; and finally, portions of the ABS-forming surface uncovered by the photo-resist coating is etched by ion beam to form an ABS.

In related art, a manufacturing process of the slider is typically based on a plurality of slider row bars, each of which is constructed by a plurality of slider bodies. A slider row bar may comprise 30-100 slider bodies according to different product type. These slider row bars are encapsulated together by adhesive to form an entire row bar assembly. After being processed, these row bar assemblies are separated from each other and finally each of these row bar assemblies is cut into separate sliders.

FIGS. 2a-2b show a slider row bar used for forming sliders. As shown in the figures, the slider row bar 2 has a width W and a thickness T. The slider row bar 2 has an ABS-forming surface 3. FIG. 2c shows a carrier 1 for holding the slider row bars 2. The conventional slider row bar bonding method is preformed as follows: firstly, as shown in FIG. 3, a kind of fast-curing glue 5 is dispensed on the carrier 1 by a glue dispenser 6. Then, as shown in FIG. 4, a slider row bar 2 is moved toward the carrier 1 by a vacuum pickup head 7 and then adhered to the carrier 1 by the fast-curing glue 5. Here, the slider row bar 2 has a slider-mounting surface 4 to contact the fast-curing glue 5, which is opposite to the ABS-forming surface 3. Next, as shown in FIG. 5, the above two steps are repeated until all the slider row bars 2 are attached on the carrier 1, and then, the row bars are kept for 1-3 hours so that the glue 5 is cured completely so that all the slider row bars 2 are fixed on the carrier 1. Then, as shown in FIG. 6, a kind of encapsulating glue 9 is dispensed in the gaps formed between the slider row bars 2 by a glue dispenser 8. Finally, the encapsulating glue 9 is exposed to ultraviolet light and eventually cured to bond all the slider row bars 2 together to form a slider row bar assembly.

FIG. 7a shows a plurality of slider row bars 2 encapsulated together and bonded onto the carrier 1. FIG. 7b shows a cross-sectional view of FIG. 7a taken along line Z-Z. Referring to FIG. 7b, a plurality of glue recesses 30 are formed in a plurality of gaps (not labeled) between the slider row bars 2. The glue recesses 30 are formed by natural shrinkage of the encapsulating glue 9 during curing process. Referring to FIG. 7a and FIG. 7b, the ABS-forming surfaces 3 of the slider row bars 2 and the glue recesses 30 form a base surface of the slider row bar assembly on which a photo-resist coating will be covered.

Also referring to FIG. 7b, it is easily to understand that the flatness of the base surface of the slider row bar assembly is mainly determined by two factors: the glue recesses 30 and thickness uniformity of the slider row bars 2. First, as the slider row bars 2 have a small thickness, normally in a range of hundreds of microns, it is very difficult to improve thickness uniformity of the slider row bars 2. On the other hand, the glue recesses 30 are unavoidable due to the inherent character of the encapsulating glue 9. In the conventional slider row bar bonding process, because each of the slider row bars 2 and the glue 5 thereunder has a different thickness (i.e. the slider row bars 2 and the glue 5 thereunder has a thickness variation), and there are the glue recesses 30, the flatness of the base surface of the slider row bar assembly is decreased seriously. Accordingly, a photo-resist coating formed on the base surface of the slider row bar assembly has a bad flatness.

In the photolithography process of forming the ABS of the slider, the flatness of the photo-resist coating has a big influence on manufacturing accuracy of the ABS of the slider. More concretely, if the flatness of the photo-resist coating covered on the ABS-forming surfaces is bad, the ABS patterns transferred to the photo-resist coating through exposure will have a distortion in shape relative to the predetermined ABS pattern. Accordingly, the ABS pattern formed on the slider row bars by etching process will not match the predetermined ABS pattern. This will make the slider with such a ABS pattern have a bad flying stability and thus make the disk drive has a bad flying performance and may has a fear that the disk and/or the slider may be damaged.

Thus, it is desired to provide a method for bonding slider row bars for photolithography process to overcome the above-mentioned drawbacks.

SUMMARY OF THE INVENTION

One object of the invention is to provide a method for bonding a plurality of slider row bars for photolithography process, which can greatly improve the flatness of ABS-forming surface of the bonded slider row bars.

Another object of the invention is to provide a method for manufacturing sliders, which can improve manufacturing accuracy of the sliders.

To achieve the above objects, a method for bonding slider row bars for photolithography process, comprises steps of: (1) forming a holding device having a sticky surface; (2) providing a plurality of slider row bars each of which has a first surface for forming ABS and a second surface opposite to the first surface, and securing the slider row bars on the holding device with their first surfaces facing to the sticky surface; (3) bonding the slider row bars together by an encapsulating glue; (4) providing a carrier and bonding the carrier to the second surfaces of the slider row bars; (5) removing the holding device.

In an embodiment, the step (1) comprises steps of: (a) providing a frame having an hole therein; (b) providing a film having a sticky layer serving as the sticky surface and a non-sticky layer laminated together, and covering the film on the frame with the sticky layer facing to the frame; (c) providing a vacuum transfer fixture having a base plate and a protrusion stage which is positioned on the base plate and has a plurality of vacuum holes defined therein; (d) assembling the vacuum transfer fixture to the frame with the protrusion stage received in the hole of the frame and contacting with the non-sticky layer of the film to form the holding device. In addition, the method may further comprise a step of evacuating spaces defined by the vacuum holes and non-sticky layer to generate air pressure to press the film against the protrusion stage after the step (1).

The step (3) may comprise steps of: (i) providing a glue-restraining plate having an opening and attaching the glue-restraining plate to the sticky layer of the film such that the slider row bars are exposed from the opening; (ii) dispensing the encapsulating glue into the opening of the glue-restraining plate; (iii) laminating the encapsulating glue dispensed in the opening of the glue-restraining plate such that the encapsulating glue flows into spaces defined between the slider row bars; (iv) curing the encapsulating glue such that all the slider row bars are bonded together.

The step (4) may comprise steps of: providing a kind of fast-curing glue and dispensing the fast-curing glue to the second surfaces of the slider row bars; and attaching the carrier to the second surfaces of the slider row bars via the fast-curing glue. Moreover, an elastic layer may be sandwiched between the carrier and the second surfaces of the slider row bars to absorb shrinkage stress generated by the fast-curing glue.

The step (5) may comprise steps of: (A) removing the vacuum transfer fixture from the frame; and (B) removing the film from the slider row bars.

The encapsulating glue may be any suitable adhesive, such as a kind of adhesive comprising cyanoacrylate.

A method for manufacturing sliders, comprises steps of: (1) forming a holding device having a sticky surface; (2) providing a plurality of slider row bars each of which has a first surface for forming ABS and a second surface opposite to the first surface, and securing the slider row bars on the holding device with their first surfaces facing to the sticky surface; (3) bonding the slider row bars together by an encapsulating glue; (4) providing a carrier and bonding the carrier to second surfaces of the slider row bars; (5) removing the holding device; (6) etching the first surfaces of the slider row bars; (7) cutting the slider row bars into separate sliders.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 1b is a perspective view of a slider of the disk drive device shown in FIG. 1a;

FIG. 2b is an enlarged view of portion A of the slider row bar shown in FIG. 2a;

DETAILED DESCRIPTION OF THE INVENTION

Figure 1A:
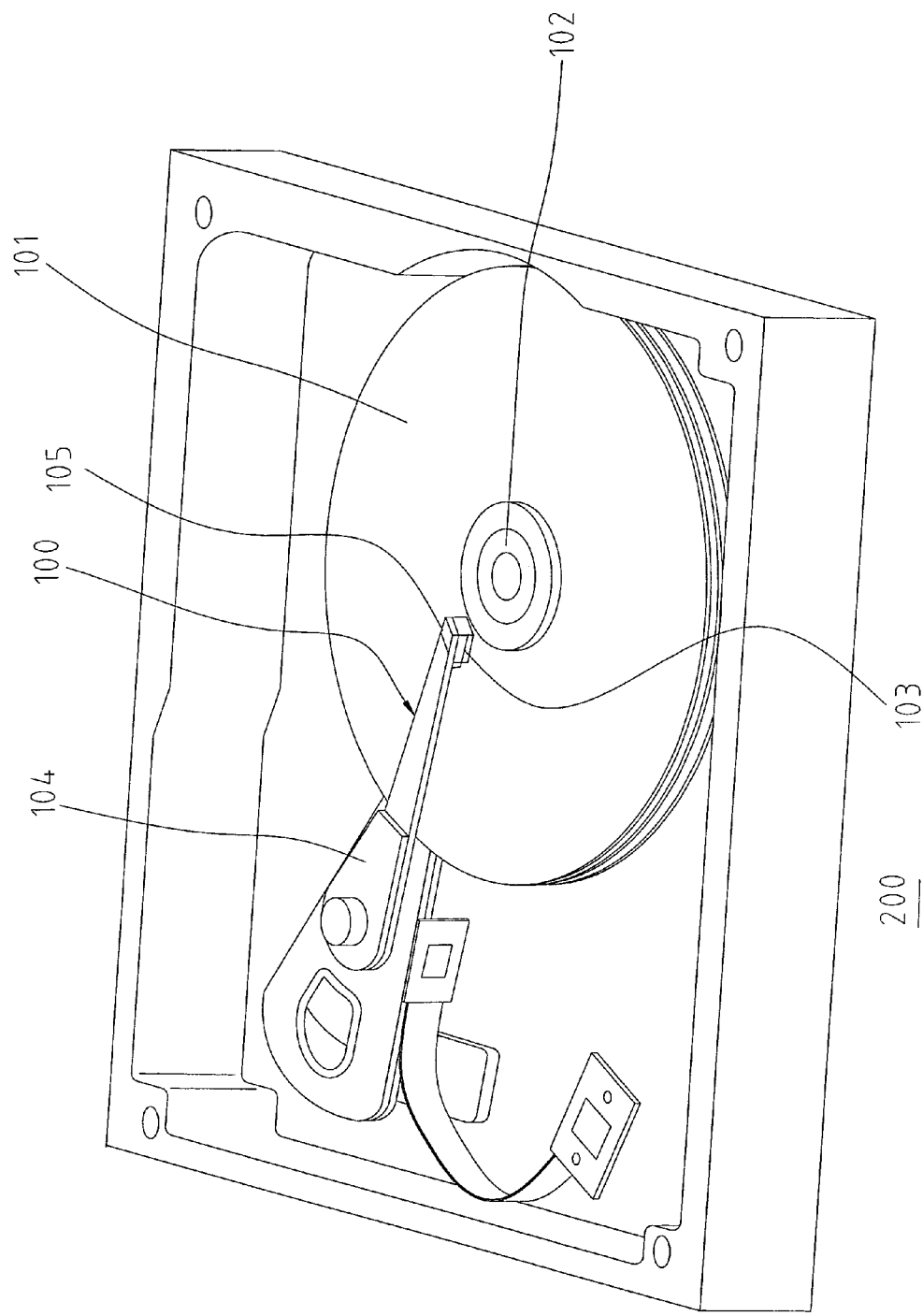
FIG. 1a is a perspective view of a conventional disk drive device.
Figure 1B:
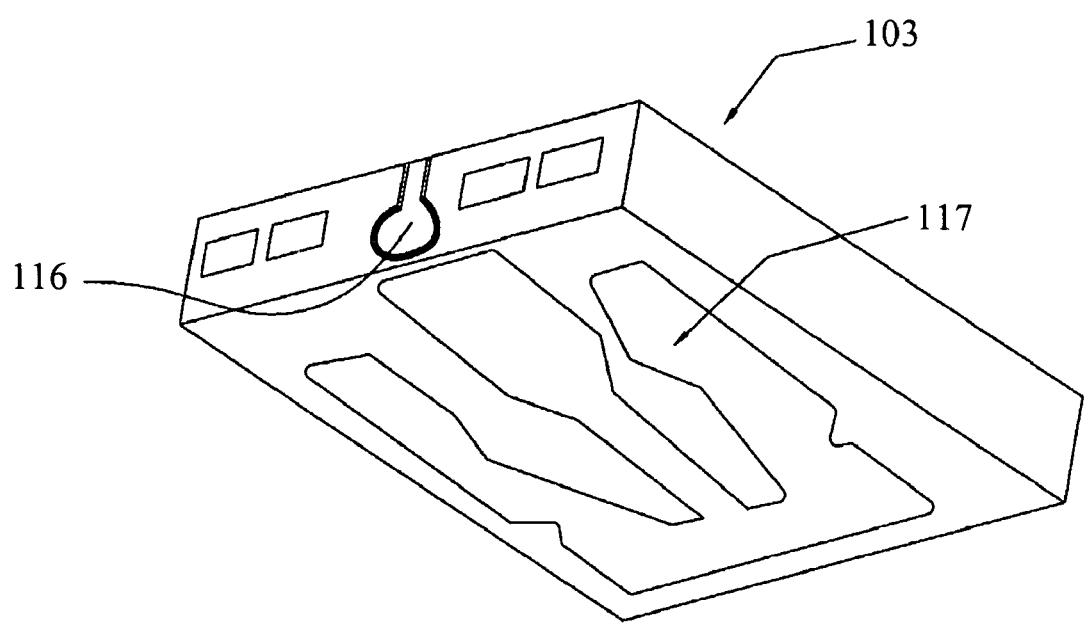
Figure 2A:
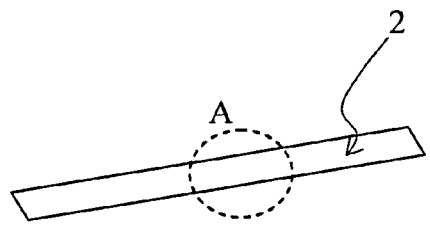
FIG. 2a is a perspective view of a slider row bar used in a slider row bar bonding process.
Figure 2B:
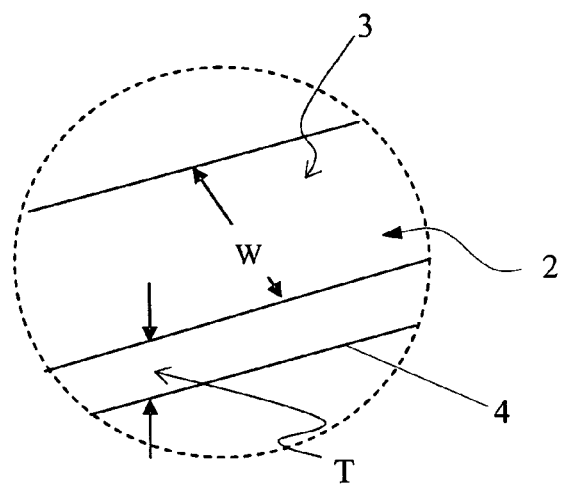
Figure 2C:
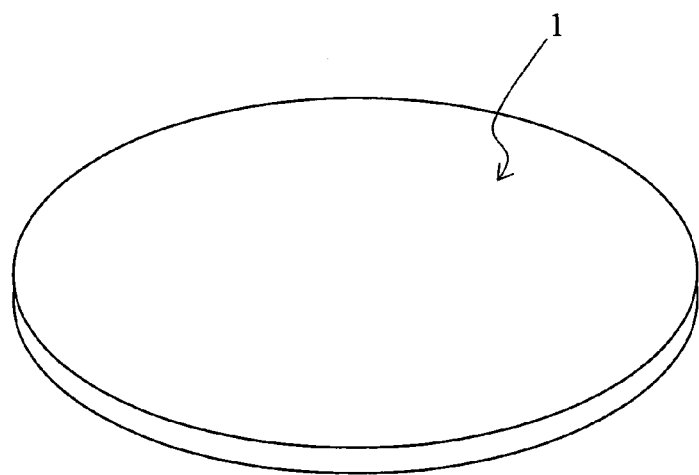
FIG. 2c is a perspective view of a carrier used in a conventional process of bonding slider row bar.
Figure 3:
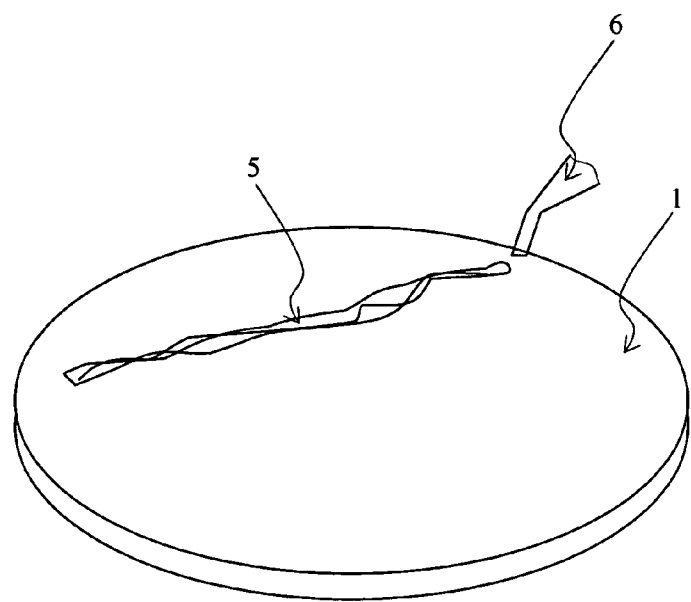
FIG. 3 shows a process of dispensing fast-curing glue on the carrier of FIG. 2c.
Figure 4:
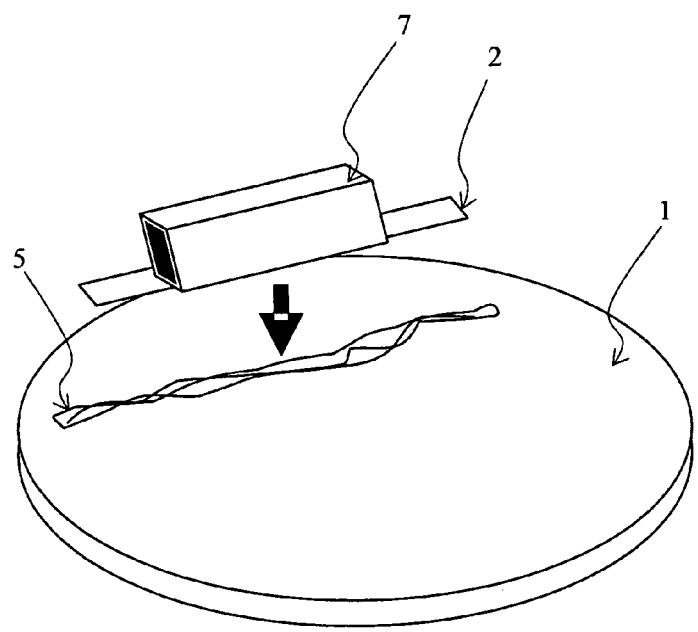
FIG. 4 shows a process of bonding a slider row bar onto the carrier of FIG. 2c.
Figure 5:
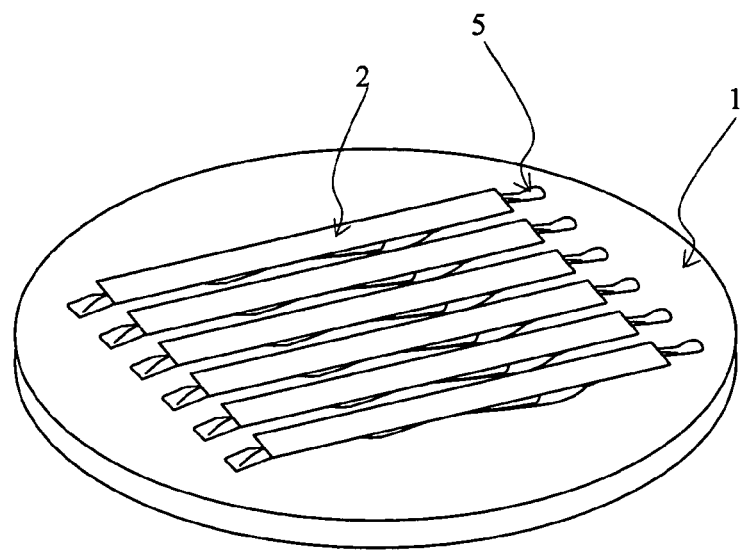
FIG. 5 shows an array of slider row bars bonded on the carrier of FIG. 2c.
Figure 6:
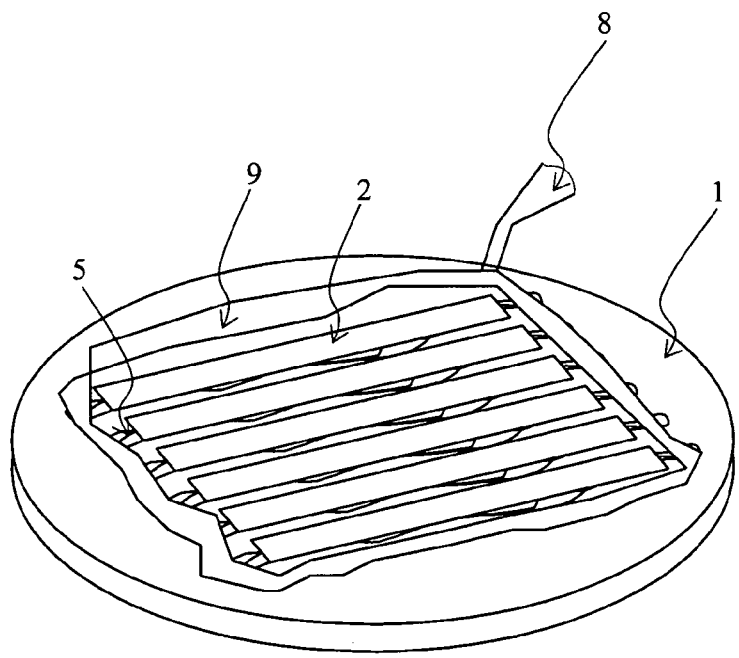
FIG. 6 shows a process of dispensing encapsulating glue on gaps formed between adjacent slider row bars of FIG. 5.
Figure 7A:
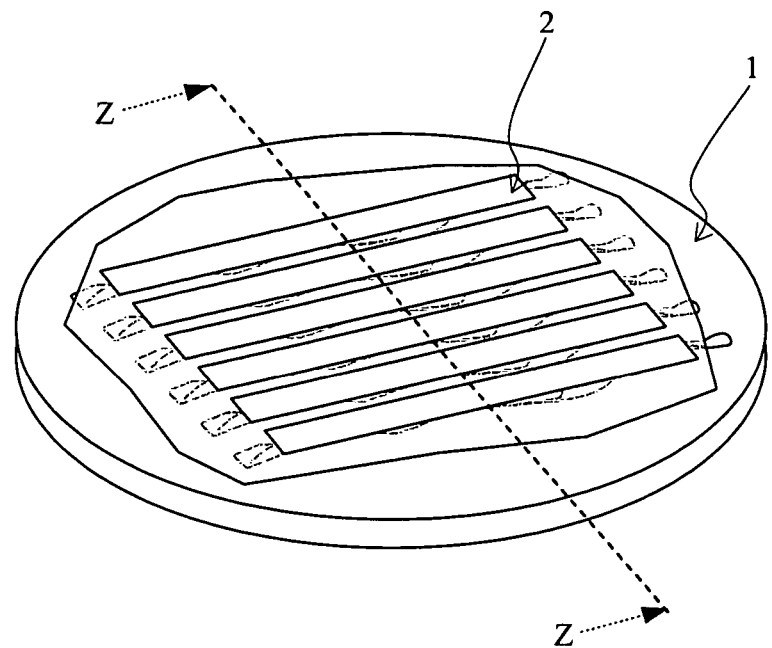
FIG. 7a shows a plurality of slider row bars encapsulated together and bonded on the carrier after the process shown in FIG. 6 is performed.
Figure 7B:
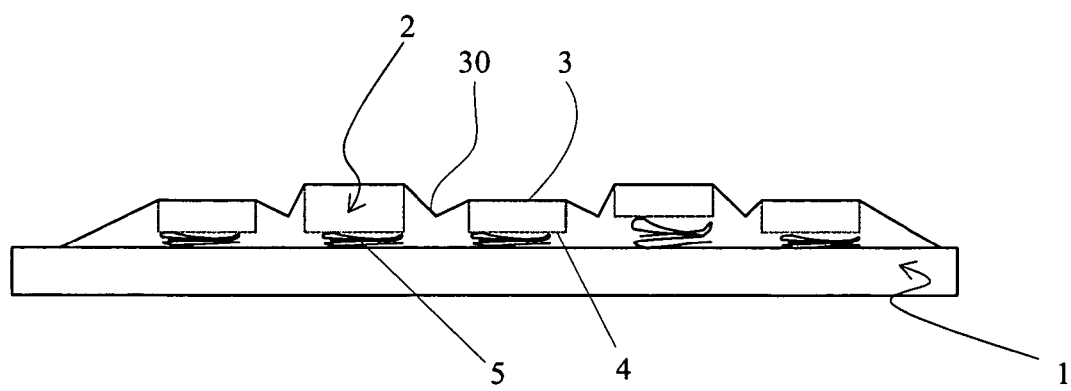
FIG. 7b shows a cross-sectional view of structure of FIG. 7a along line Z-Z.
Figure 8:
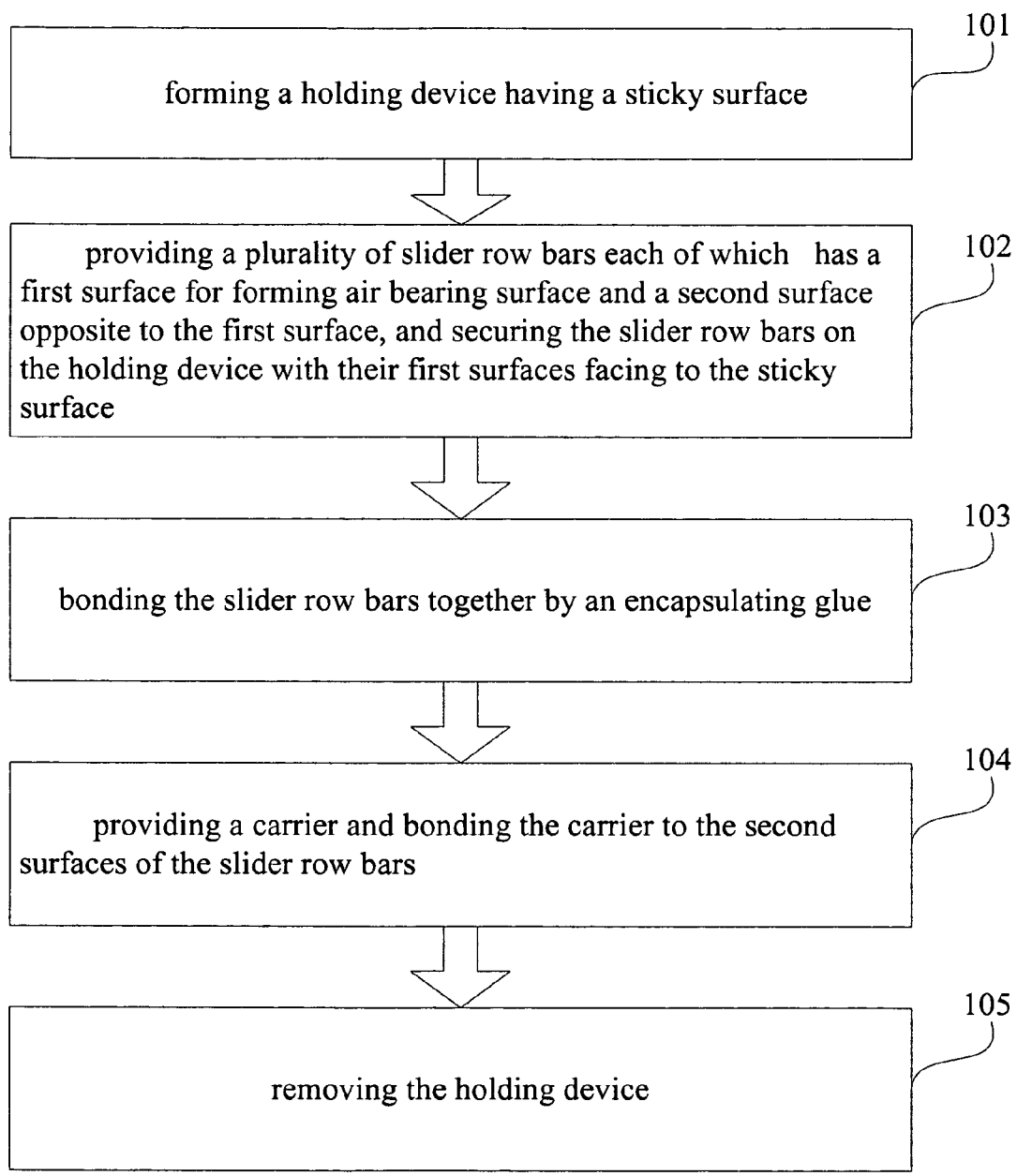
FIG. 8 shows a flowchart illustrating a process of bonding a plurality of slider row bars together according to an embodiment of the invention.

Now, according to an embodiment of the invention, a method for bonding a plurality of slider row bars together for photolithography process is described. Referring to FIG. 8, the method comprises: forming a holding device having a sticky surface (step 101); providing a plurality of slider row bars each of which has a first surface for forming ABS and a second surface opposite to the first surface, and securing the slider row bars on the holding device with their first surfaces facing to the sticky surface (step 102); bonding the slider row bars together by an encapsulating glue to form a slider row bar assembly (step 103); providing a carrier and bonding the carrier to the second surfaces of the slider row bars (step 104); removing the holding device (step 105).

Figure 9A:
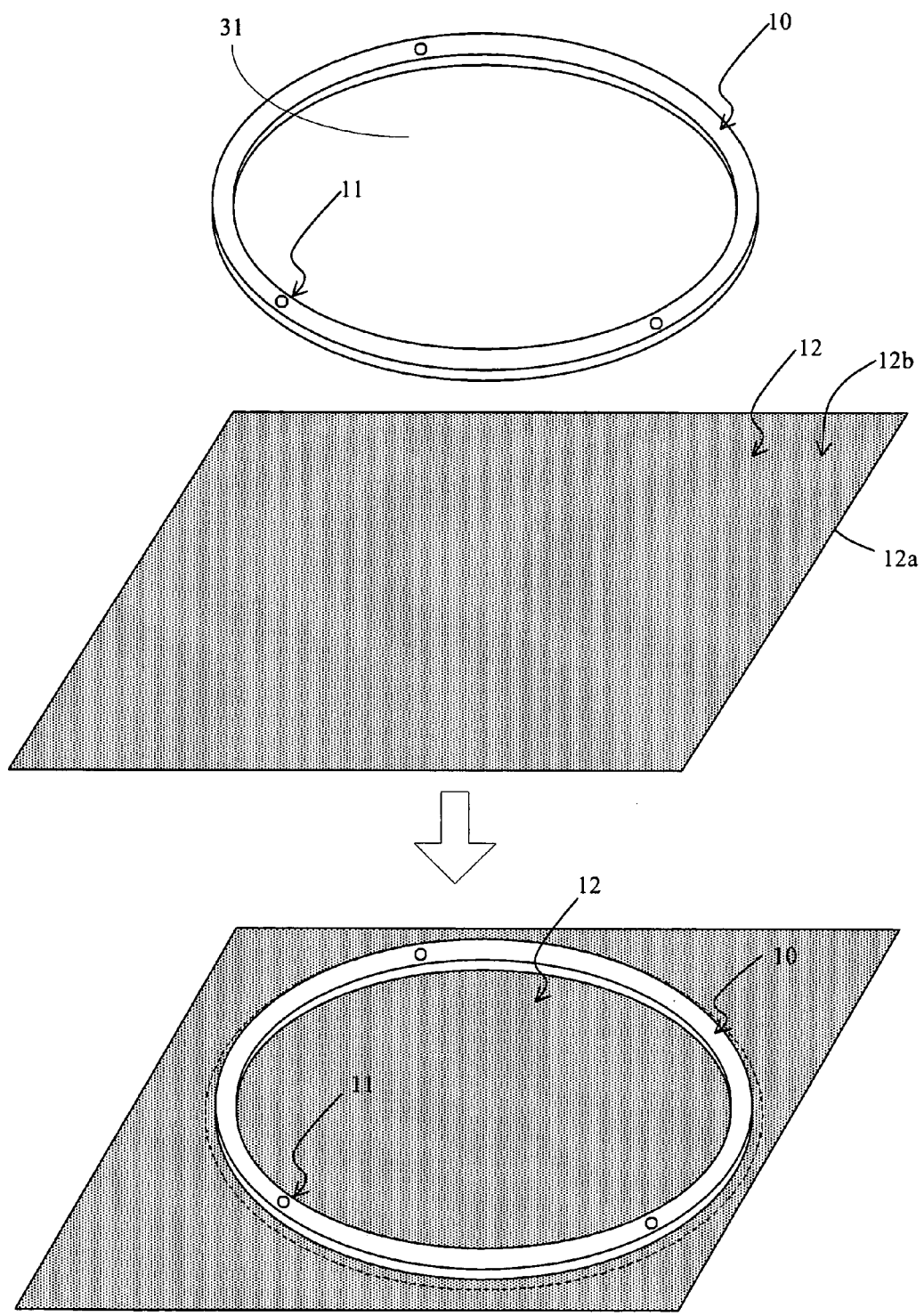
FIGS. 9a-9d are sequential views illustrating a process of forming a holding device for temporarily holding a plurality of slider row bars thereon.
Figure 9B:
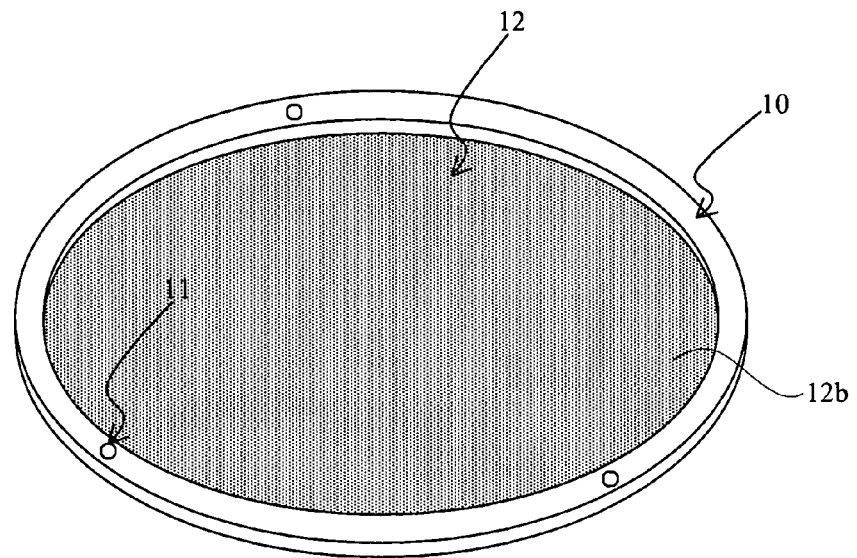

FIGS. 9a-9d illustrate the step 101 of the method. As shown in FIG. 9a, providing a frame 10 having a hole 31 defined therein and a plurality of screw holes 11 formed on its perimeter. The frame 10 may be made of any rigid material, such as steel or ceramic so as to provide sufficient stiffness. Also provided is a film 12 that comprises a sticky layer 12b and a non-sticky layer 12a laminated with the sticky layer 12b. The film 12 is attached to the frame 10 by attaching its sticky layer 12b to the frame 10 so that the hole 31 of the frame 10 is completely covered by the film 12. Then, as shown in FIG. 9b, a part of the film 12 beyond the perimeter of the frame 10 is cut away such that the film 12 has a shape consistent with the frame 10.

Figure 9C:
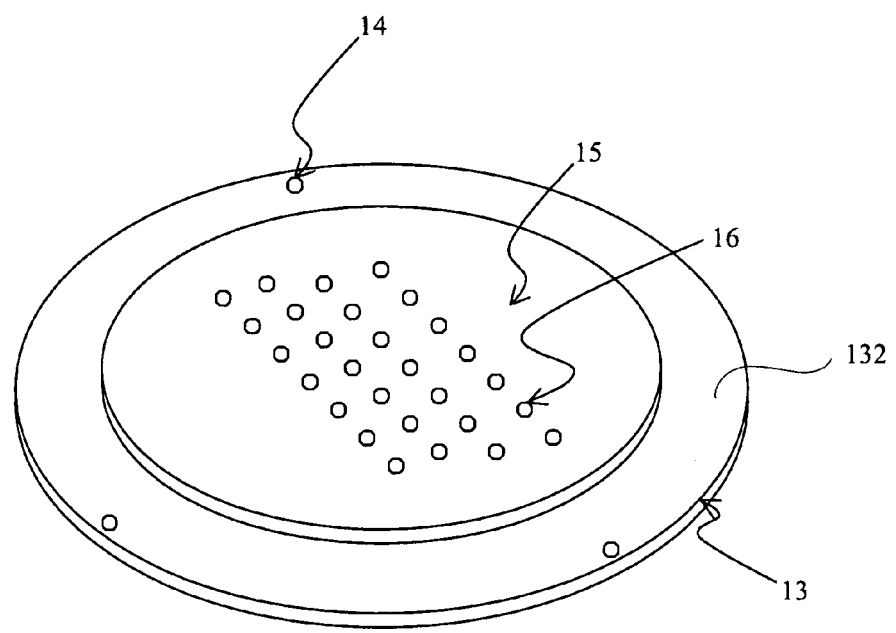
Figure 9D:
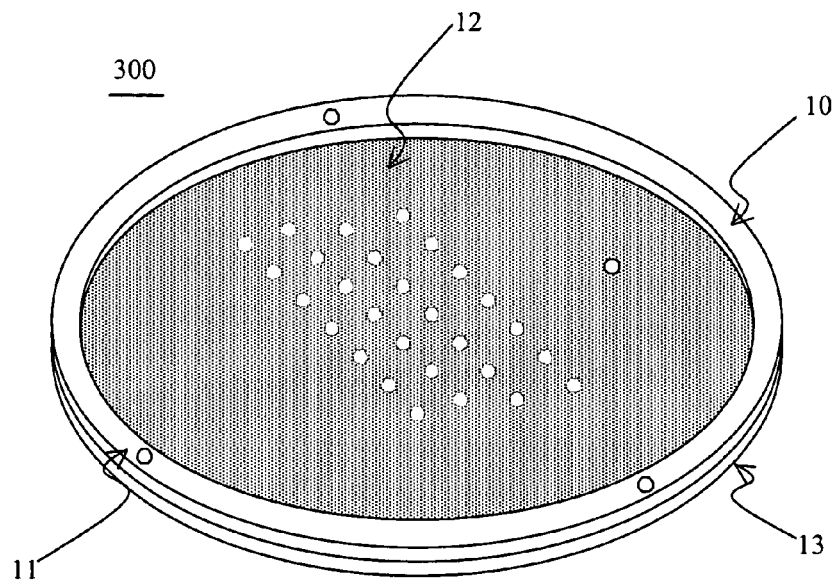

Next, as shown in FIGS. 9c-9d, a vacuum transfer fixture 13 is provided. The vacuum transfer fixture 13 has a base plate 132 and a protrusion stage 15 extended from the base plate 132. Corresponding to the screw holes 11 of the frame 10, a plurality of screw holes 14 is formed on the perimeter of the base plate 132. A plurality of vacuum holes 16 are formed in the protrusion stage 15. The vacuum transfer fixture 13 is then assembled to the frame 10 with the protrusion stage 15 received in the hole 31 (refer to FIG. 9a) and covered by the non-sticky layer 12a (refer to FIG. 9a) of the film 12, thus forming a holding device 300. The vacuum transfer fixture 13 may be assembled to the frame 10 using a plurality of bolts (not shown) which screwing in respective screw holes 11 and 14. Finally, spaces defined between the vacuum holes 16 of the vacuum transfer fixture 13 and the film 12 are evacuated by suitable device, for example a pump, to generate air pressure to press the film 12 against the protrusion stage 15.

Figure 10A:
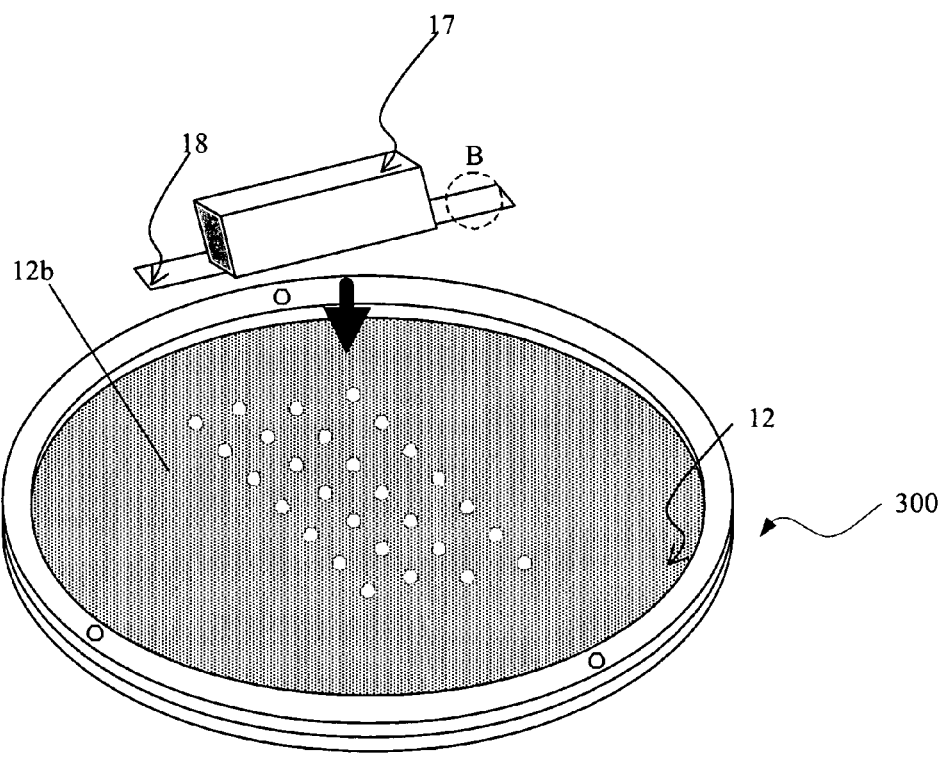
FIGS. 10a-10c are sequential views illustrating a process of attaching a plurality of slider row bars on the holding device formed by the process shown in FIGS. 9a-9d.
Figure 10B:
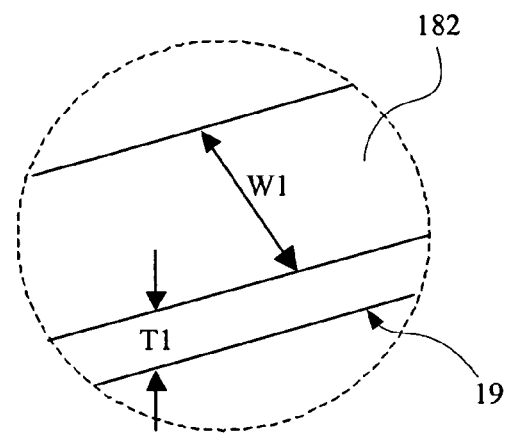
Figure 10C:
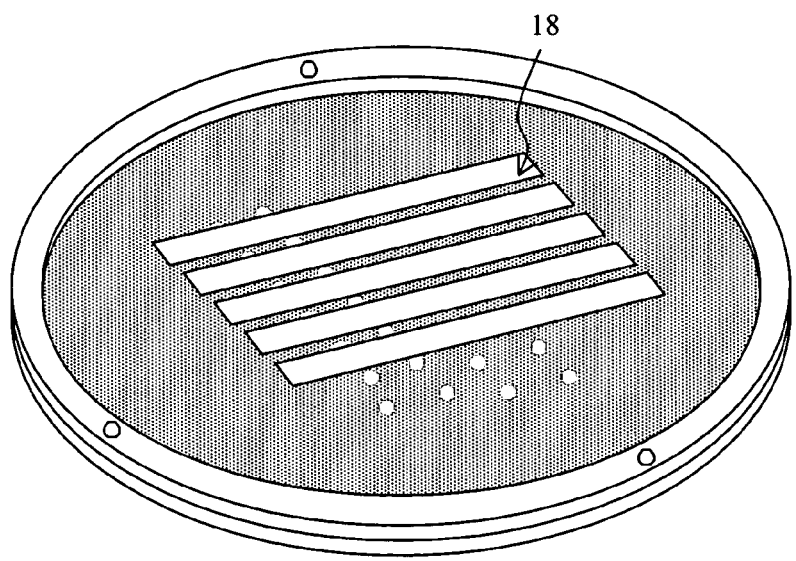

FIGS. 10a-10c illustrate the step 102 of the method. As illustrated, a plurality of slider row bars 18 is attached to the holding device 300. Each slider row bar 18 has a width W1 and a thickness T1. In addition, each slider row bar 18 has a first surface 19 for forming an air bearing surface (ABS-forming surface, also refer to FIG. 13d) and a second surface 182 (slider-mounting surface) opposite to the first surface 19. The first surface 19 is to be processed in a consequent manufacturing process such as a photolithography process so as to form an ABS pattern thereon. In this step, a vacuum pickup head 17 is repeatedly used to hold the slider row bar 18 and move it onto the sticky layer 12b of the film 12. Then, each slider row bar 18 is attached to the sticky layer 12b with its first surface 19 attached to the sticky layer 12b.

Figure 11A:
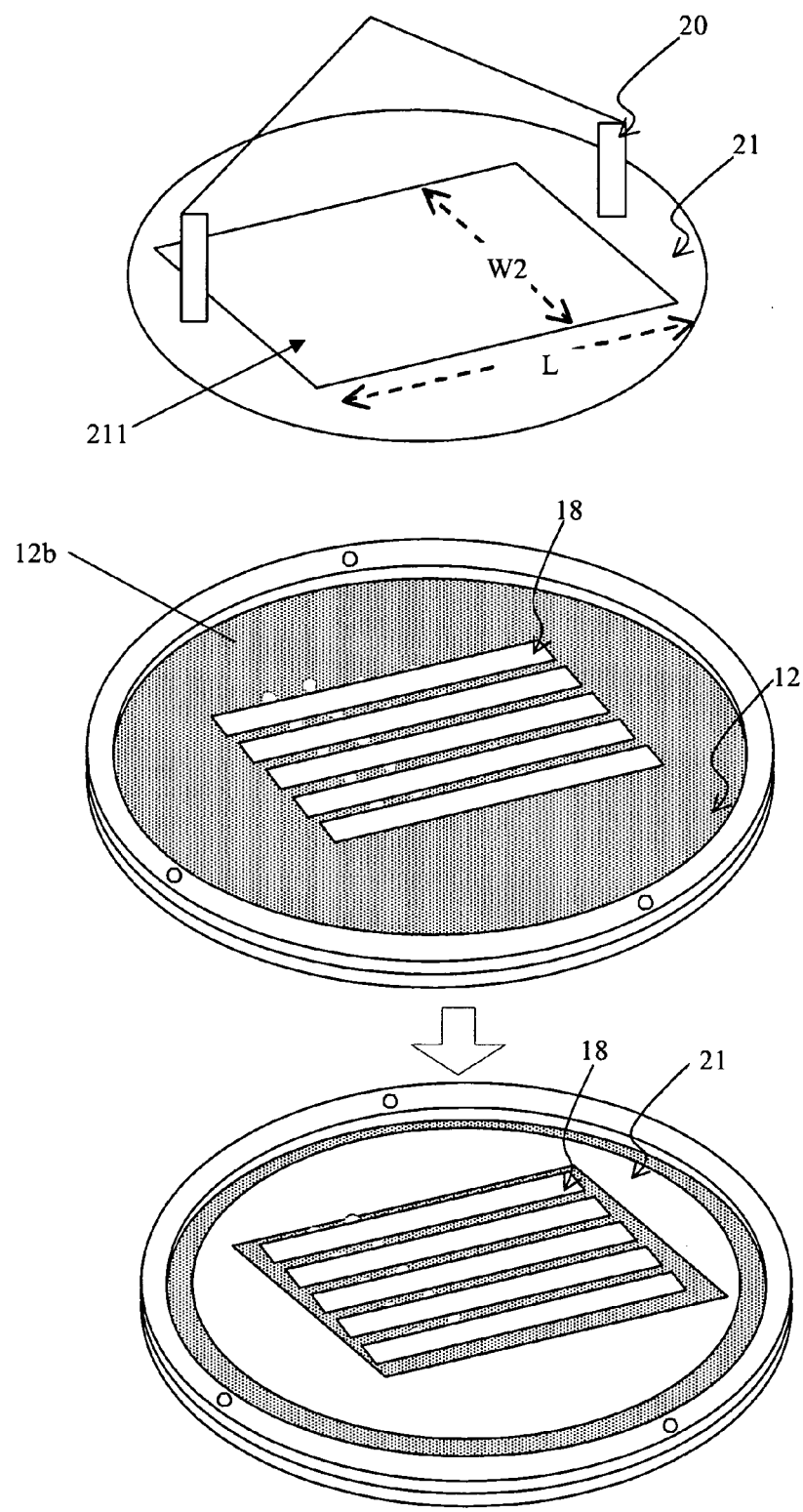
FIGS. 11a-11d sequentially show a set of views illustrating a process of encapsulating the slider row bars together, the slider row bars being carried on the holding device by process shown in FIGS. 10a-10c.
Figure 11B:
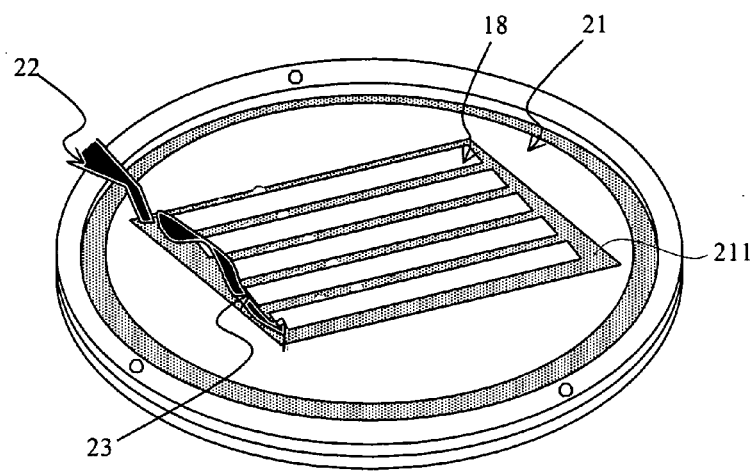
Figure 11C:
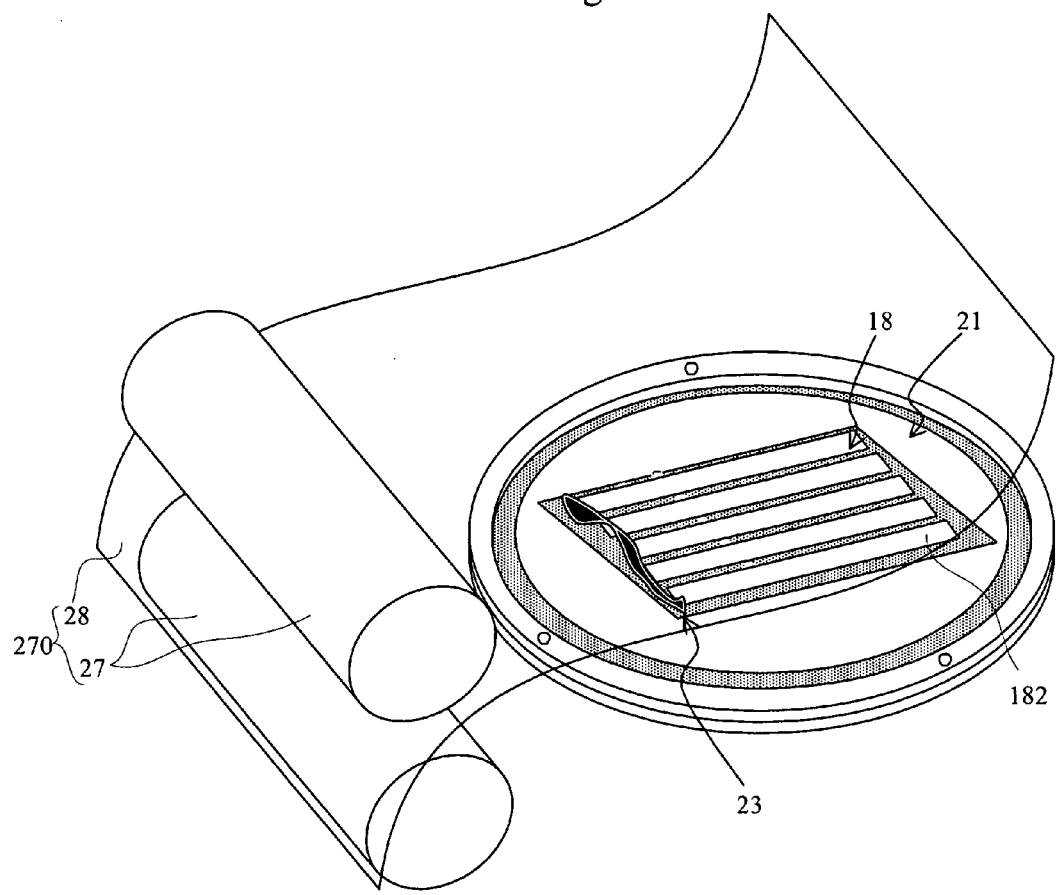
Figure 11D:
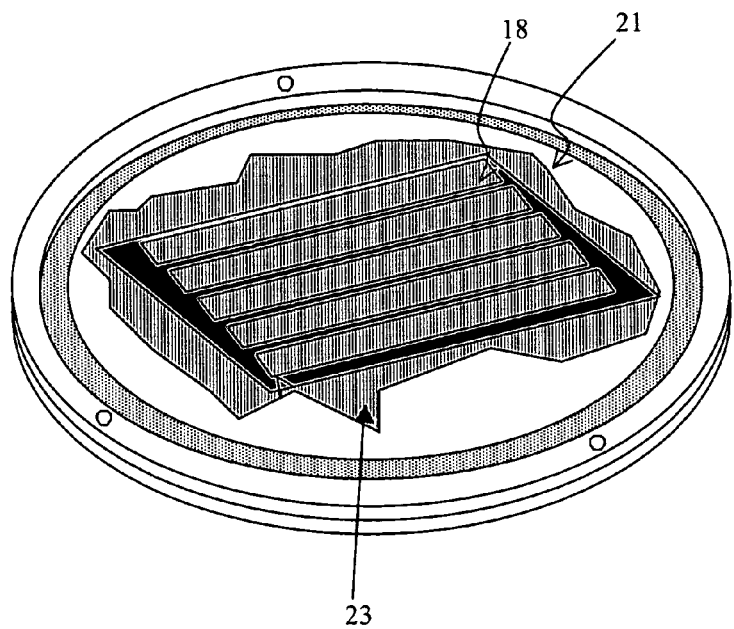

FIGS. 11a-11d show sequential views illustrating the step 103 of the method. Firstly, as shown in FIG. 11a, a glue-restraining plate 21 having an opening 211 is moved by a vacuum pickup head 20 and attached to the sticky layer 12b of the film 12, such that the slider row bars 18 held on the sticky layer 12b are exposed from the opening 211. Then, as shown in FIG. 11b, a kind of encapsulating glue 23, such as cyanoacrylate, is dispensed into the opening 211 by a dispenser 22. Next, as shown in FIGS. 11c-11d, the encapsulating glue 23 dispensed in the opening 211 is laminated such that it flows evenly into all spaces defined between the slider row bars 18. The laminating process is performed via a laminator 270. More specifically, the laminator 270 is constructed by a pair of roller 27 and a liner film 28 disposed between the two rollers 27. Of course, the laminator 270 may has any other suitable structure to performing the above-identified function. When performing the laminating process, the liner film 28 is covered on the second surfaces 182 of the slider row bars 18, while the two rollers 27 roll along the liner film 28 so that the encapsulating glue 23 is squeezed. Finally, the encapsulating glue 23 is cured such that all the slider row bars 18 are bonded together.

Figure 12A:
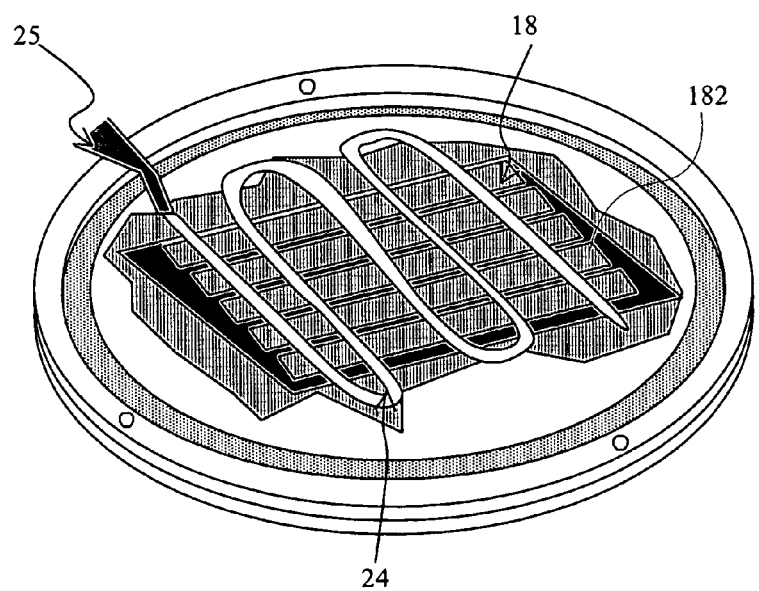
FIGS. 12a-12b show a process of mounting a carrier onto the backside of the slider row bars which are encapsulated together by the process shown in FIGS. 11a-11d.
Figure 12B:
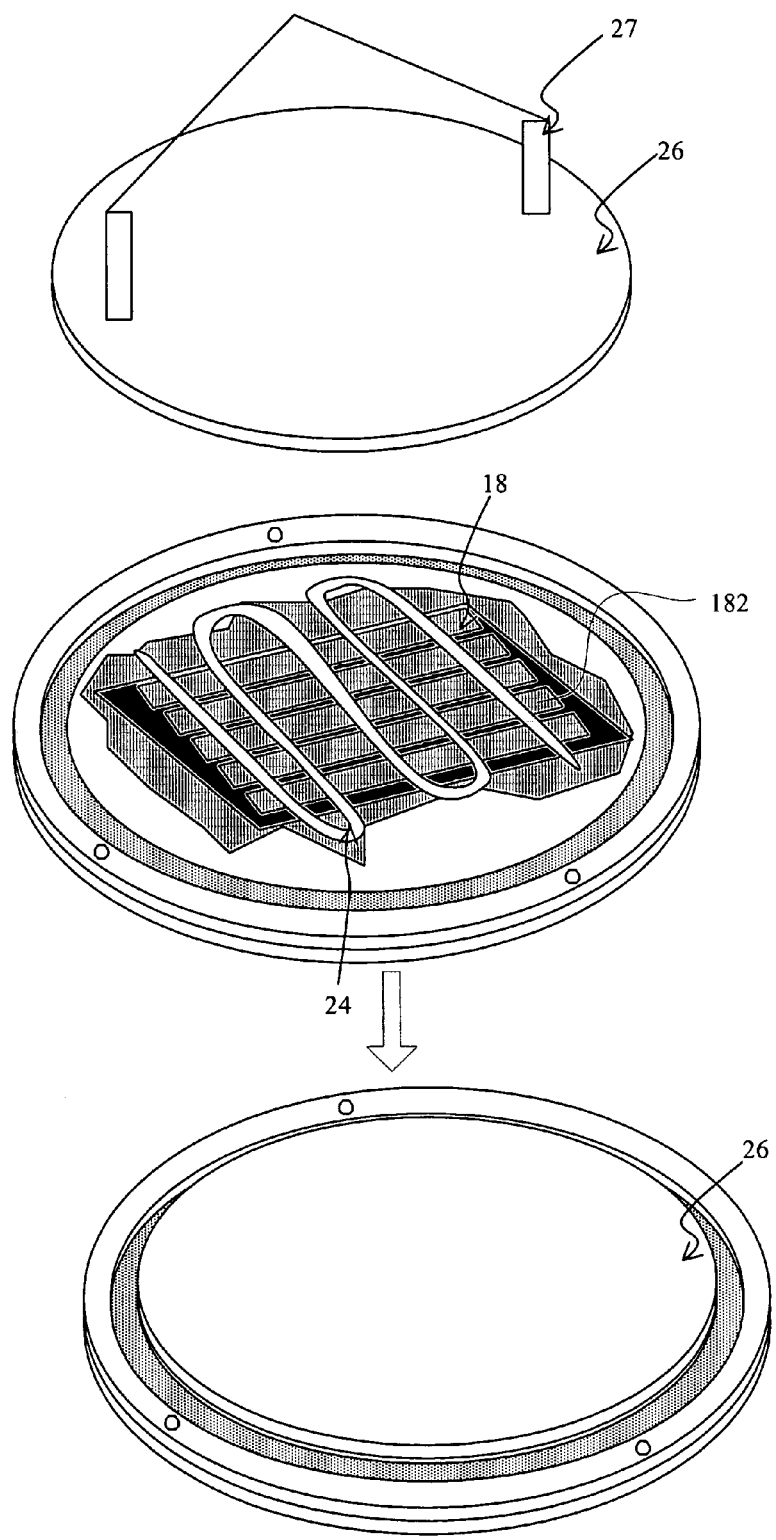

FIGS. 12a-12b show sequential views illustrating the step 104 of the method. Firstly, as shown in FIG. 12a, a kind of fast-curing glue 24 is dispensed on the second surfaces 182 of the slider row bars 18 by a dispenser 25. Then, as shown in FIG. 12b, a carrier 26 is moved by a vacuum pickup head 27 and attached to the second surfaces 182 of the slider row bars 18 via the fast-curing glue 24, such that the entire slider row bars 18 are covered completely by the carrier 26.

In addition, an elastic layer 29 (refer to FIG. 13d) may be sandwiched between the carrier 26 and the slider row bars 18. When the fast-curing glue 24 shrinks due to its nature, a shrinkage stress will be generated. The shrinkage stress will cause the carrier 26 along with the slider row bars 18 held thereon to be deformed negatively. The elastic layer 29 helps reduce the deformation. In addition, the elastic layer 29 also functions as curing agent of the attaching glue 24 to facilitate the curing process. It is noted that though in the embodiment, an elastic film is used for absorbing the stress; however, this elastic film may be omitted in case that the stress is too weak to be accounted.

Figure 13A:
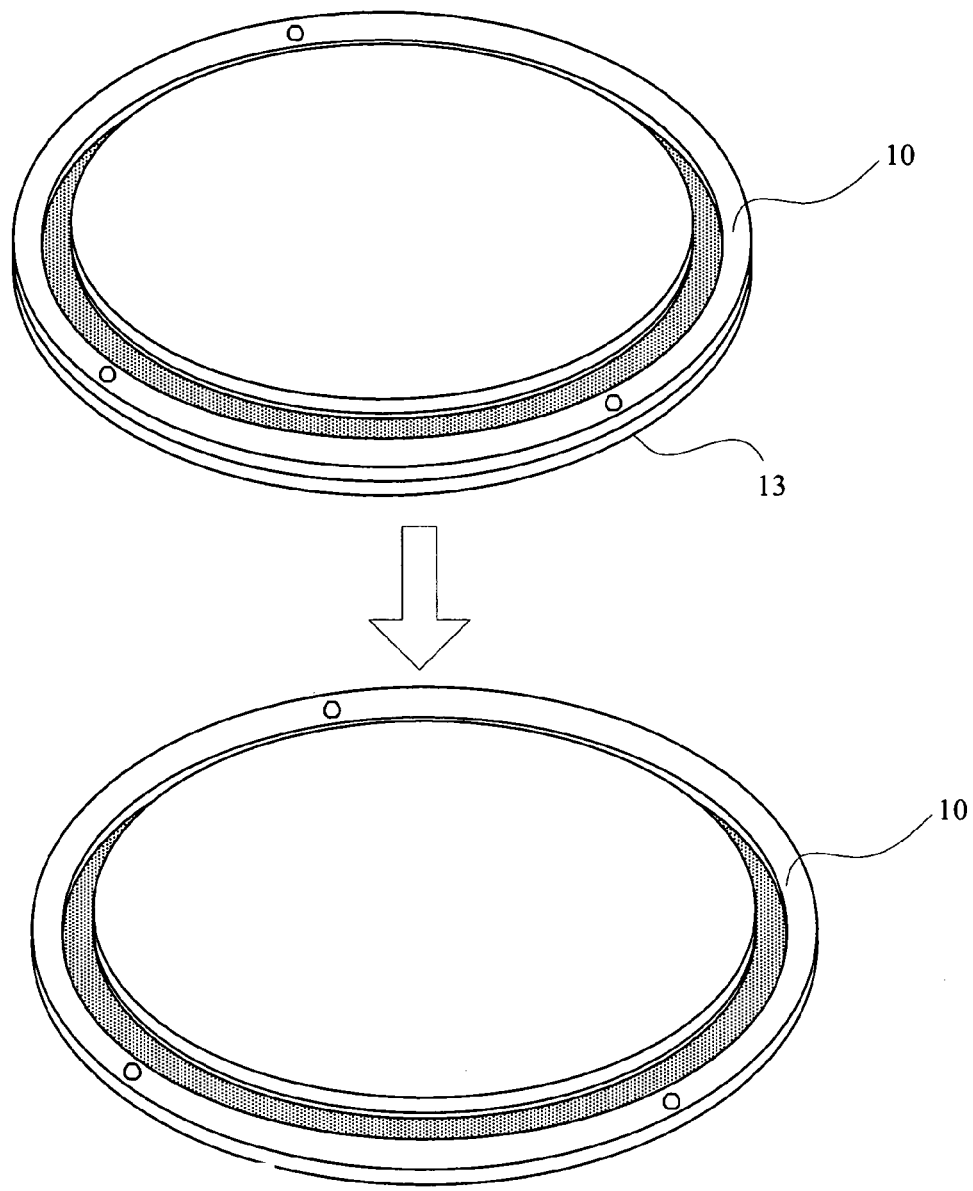
FIGS. 13a-13d show a process for removing holding device.
Figure 13B:
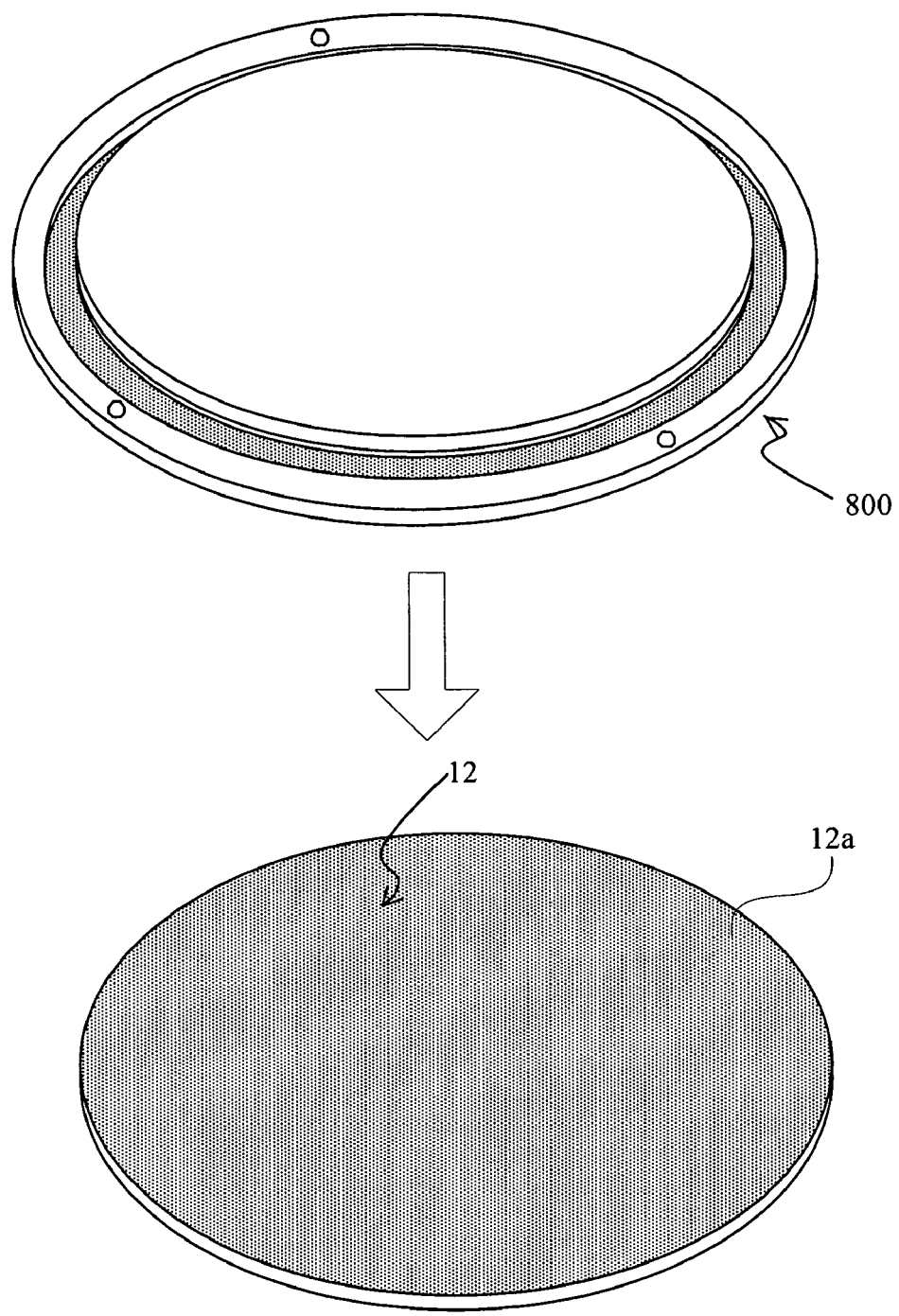
Figure 13C:
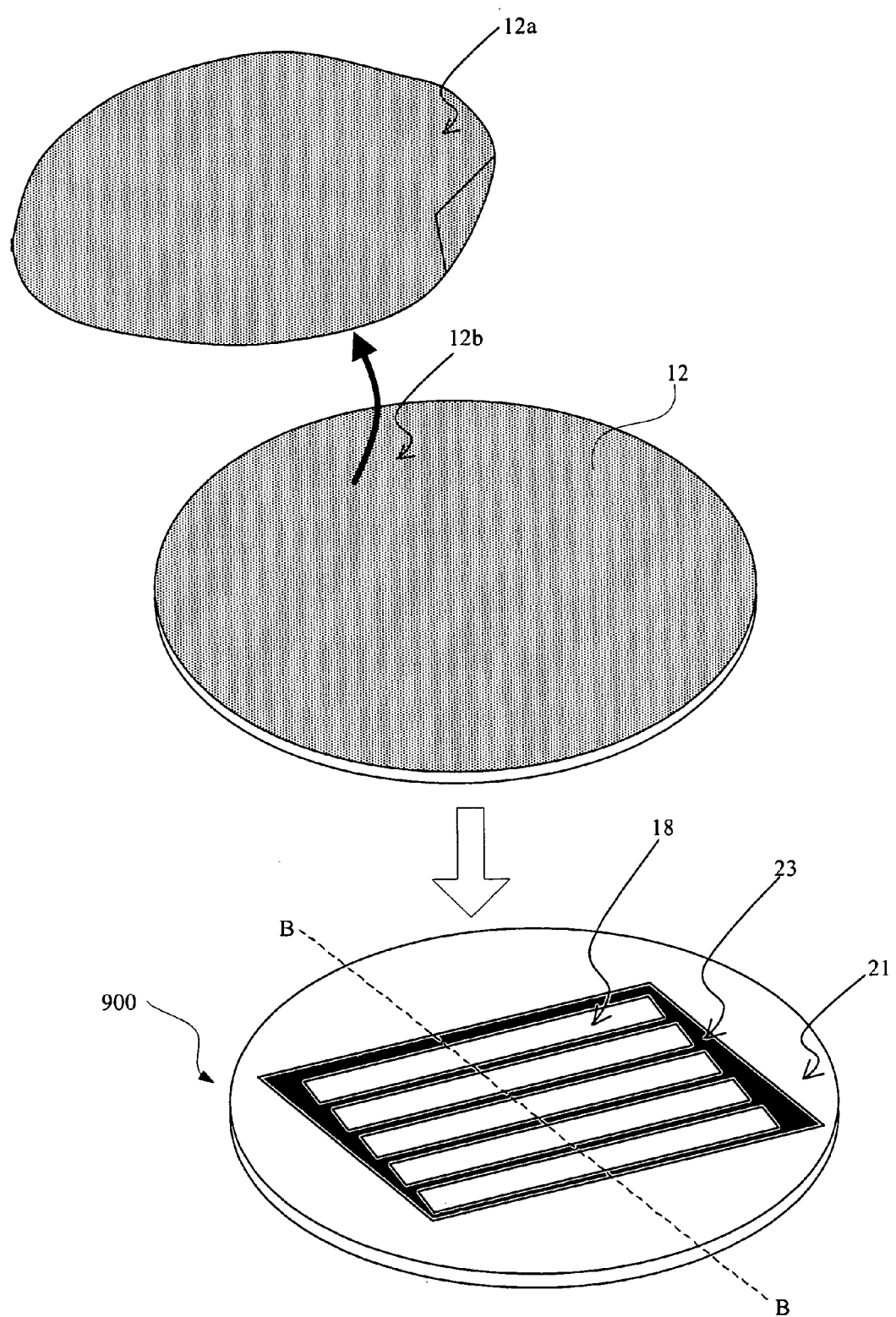
Figure 13D:
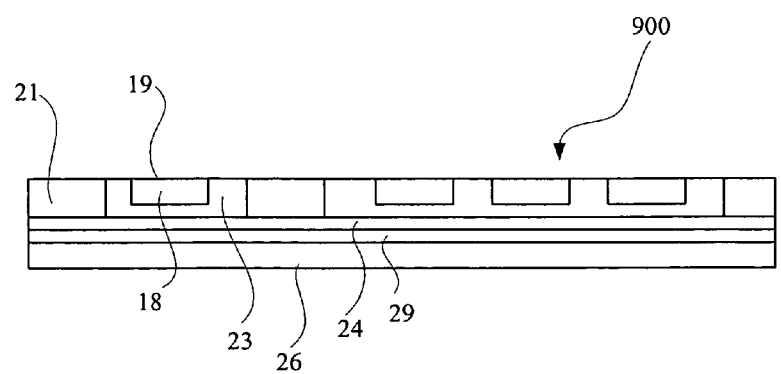

FIGS. 13a-13d show sequential views illustrating the step 105 of the method. Firstly, as shown in FIG. 13a, the vacuum transfer fixture 13 is dismounted from the frame 10 to form a combination 800. Preferably, before dismounting the vacuum transfer fixture 13 from the frame 10, the air pressure applied on the film 12 against the protrusion stage 15 of the vacuum transfer fixture 13 (as described before) may be eliminated so as to make the dismounting process easier. Then, as shown in FIG. 13b, the combination 800 is turned upside down such that the non-sticky layer 12a of the film 12 faces upward. Next, as shown in FIG. 13c, the non-sticky layer 12a of the film 12 is peeled away from the sticky layer 12b, and then the sticky layer 12b is removed from the slider row bars 18 by suitable manner such as resolving method. By removal of the film 12, an encapsulation combination 900 is formed. FIG. 13d shows a cross-sectional view of the encapsulation combination 900 of FIG. 13c along line B-B. As illustrated, the slider row bars 18 are bonded each other by the encapsulating glue 23 to form a slider row bar assembly, which being restrained by the glue-restraining plate 21. The carrier 26 and the elastic layer 29 are attached to the glue-restraining plate 21 by the fast-curing glue 24. Notably, the first surfaces 19 of the slider row bars 18 are aligned each other perfectly and therefore has a high flatness.

Figure 14:
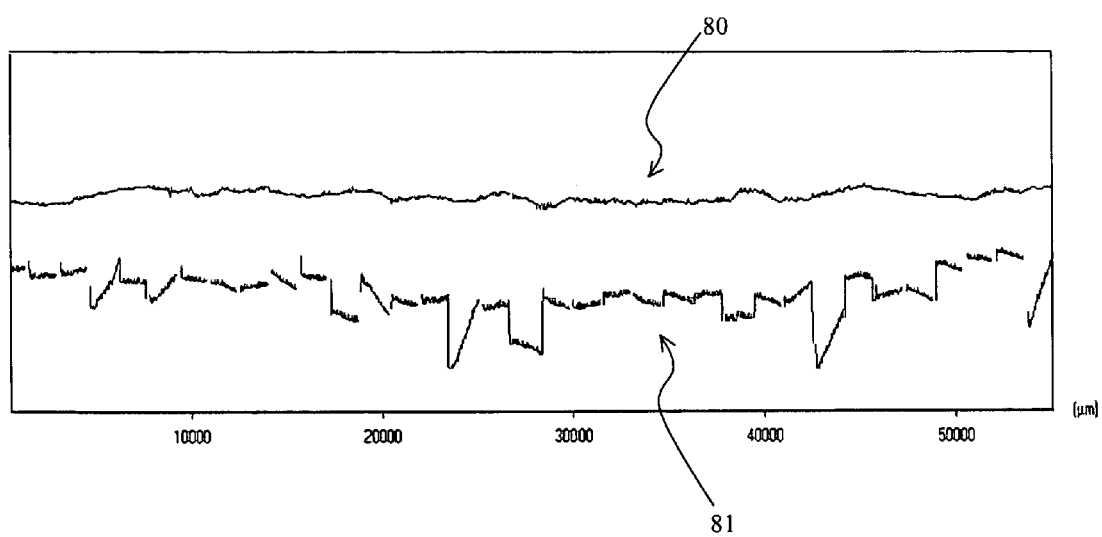
FIG. 14 shows two surface scanning characteristics of a slider row bar assembly respectively formed by the conventional method and the present method illustrated in an embodiment of the invention.

FIG. 14 shows surface scanning characteristics of the ABS-forming surface of the slider row bar assembly formed by the conventional method and method of the invention respectively. As illustrated, curve 80, which represents surface scanning characteristics of the slider row bar assembly of the invention, is smoother greatly than curve 81, which represents surface scanning characteristics of the slider row bar assembly of conventional method. In other word, utilizing the method of the invention can obtain a more ideal surface flatness of the slider row bar assembly than the conventional method.

Figure 15:
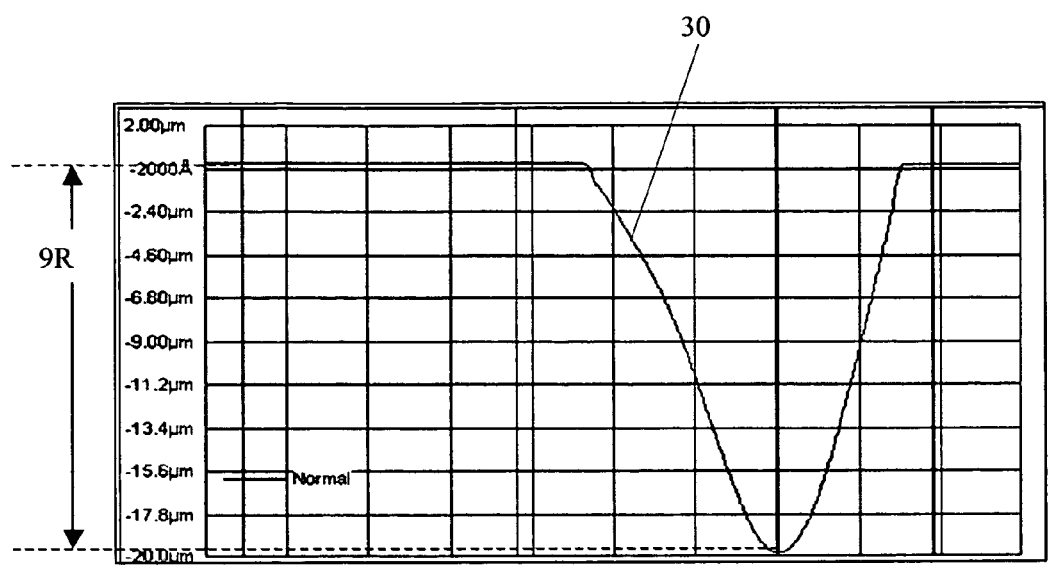
FIG. 15 shows a glue recess generated in the processing surface of a plurality of slider row bars which are encapsulated by conventional slider row bar bonding method.
Figure 16:
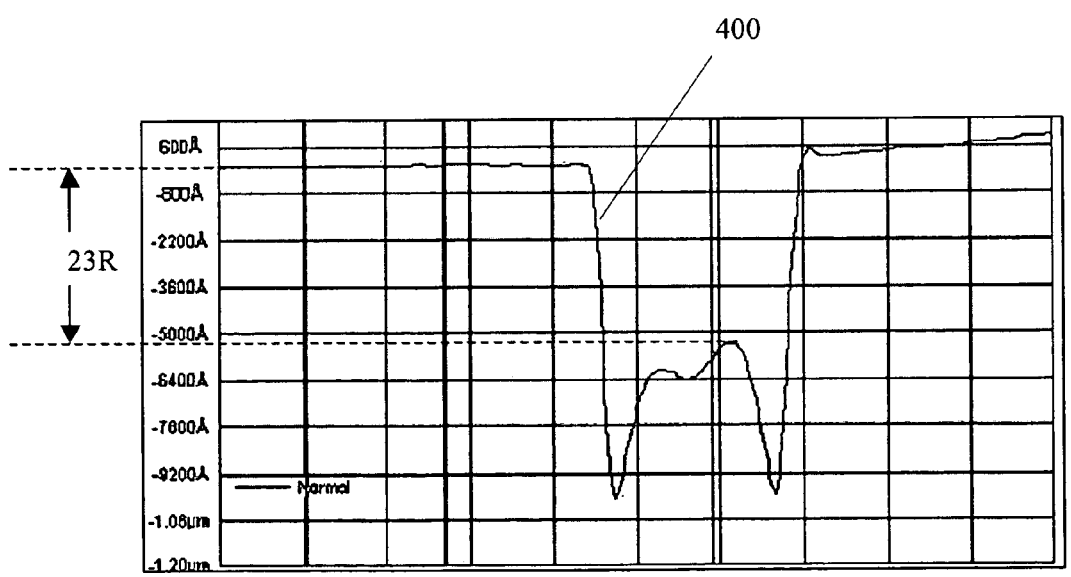
FIG. 16 shows a glue recess generated in the processing surface of the slider row bar assembly which are bonded by a slider row bar bonding method of the invention.

FIG. 16 shows a glue recess 400 formed on the ABS-forming surface of the slider row bars assembly, as illustrated, the depth presented with 23R of the glue recess 400 is only 1 μm, while the depth presented with 9R of the glue recess 30 in conventional method in FIG. 15 are 20 μm. Namely, the slider row bar assembly has shallower glue recesses than that of the conventional method.

Compared with prior art, because it is the ABS-forming surface 19 of the slider row bars 18, not the slider-mounting surfaces thereof are taken as a datum plane, an influence caused by thickness variation of the slider row bars is reduced, or even eliminated completely. In addition, since the ABS-forming surface 19 of the slider row bars 18 are pressed firmly on the protrusion stage 15 of the fixture 13, glue shrinkage at the ABS-forming surfaces is baffled by the protrusion stage 15, and thus glue recess happens mainly at the second surfaces (slider-mounting surfaces) 182 of the row bars; and therefore, influence caused by the glue recess 400 on the overall flatness of the ABS-forming surfaces is reduced greatly. That is to say, the flatness of the ABS-forming surface of the slider row bars assembly (the bonded slider row bars) is improved greatly so that the slider manufacturing by the method of the invention may have an excellent flying stability, and thus the disk drive has a good flying performance and there is no fear that the disk and/or the slider may be damaged.

Figure 17:
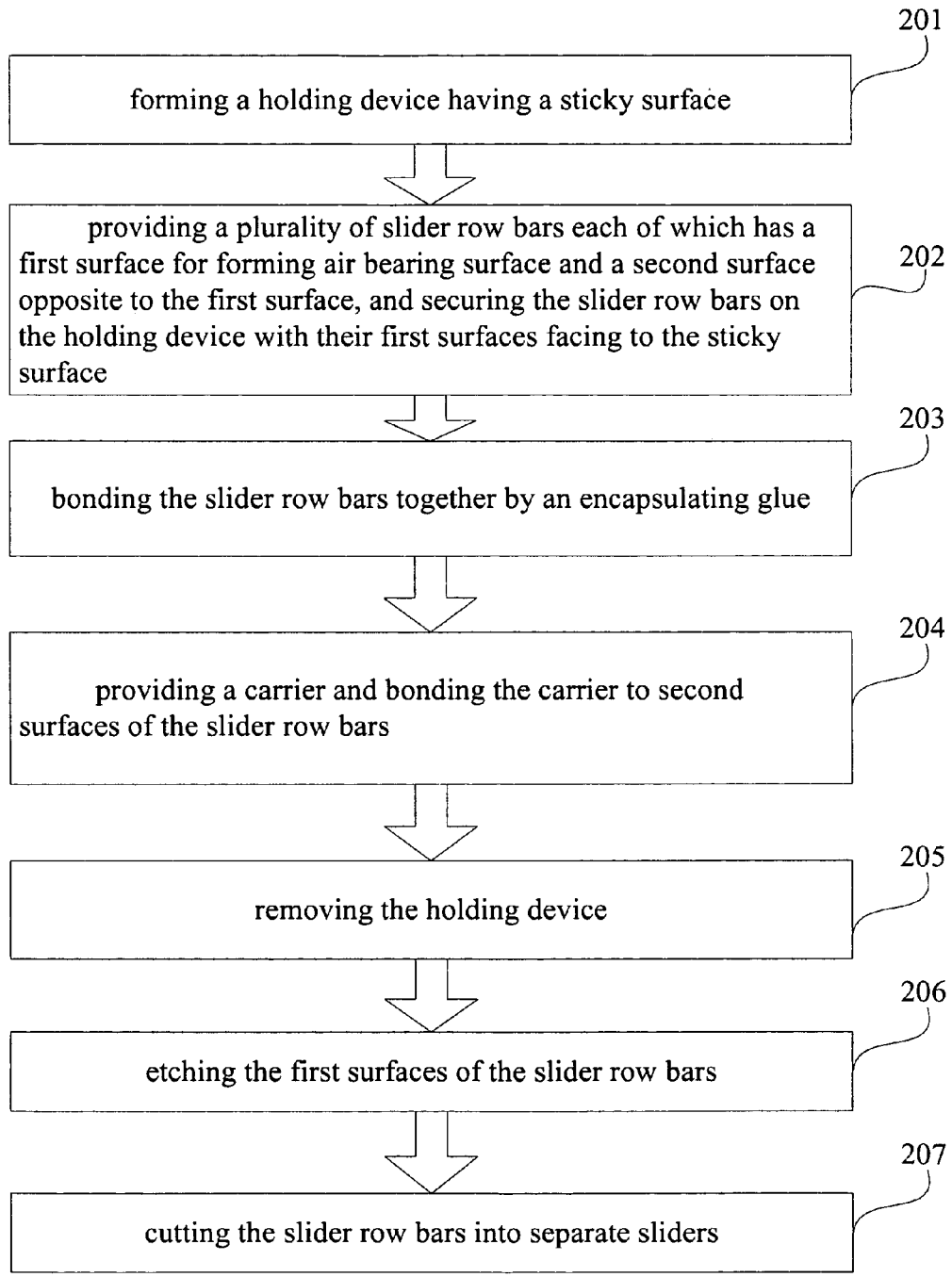
FIG. 17 shows a flowchart illustrating a slider manufacturing process according to an embodiment of the invention.

Referring to FIG. 17, A method for manufacturing sliders, comprises steps of: forming a holding device having a sticky surface (step 201); providing a plurality of slider row bars each of which has a first surface for forming air bearing surface and a second surface opposite to the first surface, and securing the slider row bars on the holding device with their first surfaces facing to the sticky surface (step 202); bonding the slider row bars together by an encapsulating glue (step 203); providing a carrier and bonding the carrier to second surfaces of the slider row bars (step 204); removing the holding device (step 205); etching the first surfaces of the slider row bars (step 206); cutting the slider row bars into separate sliders (step 207).

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A method for bonding slider row bars for a photolithography process, the method comprising:
   (1) forming a holding device having a sticky surface;
   (2) providing a plurality of slider row bars each having a first surface for forming an air bearing surface and a second surface opposite to the first surface, and securing the slider row bars on the holding device with their first surfaces facing the sticky surface so that the first surfaces of the slider row bars are aligned each other;
   (3) bonding the slider row bars together by an encapsulating glue;
   (4) providing a carrier and bonding the carrier to the second surfaces of the slider row bars; and
   (5) removing the holding device,
   wherein step (1) comprises:
   (a) providing a frame having a hole therein;
   (b) providing a film having a sticky layer serving as the sticky surface and a non-sticky layer laminated together, and covering the film on the frame with the sticky layer facing to the frame;
   (c) providing a vacuum transfer fixture having a base plate and a protrusion stage which is positioned on the base plate and has a plurality of vacuum holes defined therein; and
   (d) assembling the vacuum transfer fixture to the frame with the protrusion stage received in the hole of the frame and contacting with the non-sticky layer of the film to form the holding device.

2. The method according to claim 1, further comprising, following step (1), evacuating spaces defined by the vacuum holes and non-sticky layer to generate air pressure to press the film against the protrusion stage.

3. The method according to claim 2, wherein step (3) further comprises:
   (i) providing a glue-restraining plate having an opening and attaching the glue-restraining plate to the sticky layer of the film such that the slider row bars are exposed from the opening;
   (ii) dispensing the encapsulating glue into the opening of the glue-restraining plate;
   (iii) laminating the encapsulating glue dispensed in the opening of the glue-restraining plate such that the encapsulating glue flows into spaces defined between the slider row bars; and
   (iv) curing the encapsulating glue such that all the slider row bars are bonded together.

4. The method according to claim 3, wherein step (5) further comprises:
   (A) removing the vacuum transfer fixture from the frame; and
   (B) removing the film from the slider row bars.

5. The method according to claim 1, wherein step (4) further comprises:
   providing a fast-curing glue and dispensing the fast-curing glue to the second surfaces of the slider row bars; and
   attaching the carrier to the second surfaces of the slider row bars via the fast-curing glue.

6. The method according to claim 5, wherein an elastic layer is sandwiched between the carrier and the second surfaces of the slider row bars to absorb shrinkage stress generated by the fast-curing glue.

7. The method according to claim 1, wherein the encapsulating glue comprises cyanoacrylate.

8. A method for manufacturing sliders, the method comprising:
   (1) forming a holding device having a sticky surface;
   (2) providing a plurality of slider row bars each having a first surface for forming an air bearing surface and a second surface opposite to the first surface, and securing the slider row bars on the holding device with their first surfaces facing to the sticky surface so that the first surfaces of the slider row bars are aligned each other;

(3) bonding the slider row bars together by an encapsulaiing glue;
(4) providing a carrier and bonding the carrier to second surfaces of the slider row bars;
(5) removing the holding device;
(6) etching the first surfaces of the slider row bars; and
(7) cutting the slider row bars into separate sliders,
wherein step (1) further comprises:
  (a) providing a frame having a hole therein;
  (b) providing a film having a sticky layer serving as the sticky surface and a non-sticky layer laminated together, and covering the film on the frame with the sticky layer facing to the frame;
  (c) providing a vacuum transfer fixture having a base plate and a protrusion stage which is positioned on the base plate and has a plurality of vacuum holes defined therein; and
  (d) assembling the vacuum transfer fixture to the frame with the protrusion stage received in the hole of the frame and contacting with the non-sticky layer of the film to form the holding device.

9. A method for bonding slider row bars for a photolithography process, the method comprising:

(1) forming a holding device having a sticky surface;
(2) providing a plurality of slider row bars each having a first surface for forming an air bearing surface and a second surface opposite to the first surface, and securing the slider row bars on the holding device with their first surfaces facing the sticky surface;
(3) bonding the slider row bars together by an encapsulating glue;
(4) providing a carrier and bonding the carrier to the second surfaces of the slider row bars; and
(5) removing the holding device,
wherein step (4) further comprises:
  providing a fast-curing glue and dispensing the fast-curing glue to the second surfaces of the slider row bars; and
  attaching the carrier to the second surfaces of the slider row bars via the fast-curing glue;
  wherein an elastic layer is sandwiched between the carrier and the second surfaces of the slider row bars to absorb shrinkage stress generated by the fast-curing glue.

* * * * *